United States Patent [19]
Wortman et al.

[11] 4,136,778
[45] Jan. 30, 1979

[54] LINEN SORTER

[75] Inventors: Jimmie J. Wortman, Chapel Hill; Richard A. Whisnant, Greensboro; Larry K. Monteith, Raleigh, all of N.C.

[73] Assignee: Burlington Industries, Inc., Greensboro, N.C.

[21] Appl. No.: 842,158

[22] Filed: Oct. 14, 1977

Related U.S. Application Data

[63] Continuation of Ser. No. 604,081, Aug. 12, 1975, abandoned, which is a continuation-in-part of Ser. No. 565,133, Apr. 4, 1975, abandoned.

[51] Int. Cl.² .............................................. B07C 5/346
[52] U.S. Cl. ..................................... 209/589; 209/576; 209/937; 214/1 L; 250/272; 250/277 R; 40/2 R
[58] Field of Search ............... 209/73, 111.5; 250/271, 250/272, 273, 274, 303, 458, 460, 461, 492, 277; 198/165; 302/11, 12; 214/1 L; 283/6, 7; 40/2.2, 2 R, 19.5

[56] References Cited
U.S. PATENT DOCUMENTS

| | | | |
|---|---|---|---|
| 2,773,196 | 12/1956 | Hall | 250/303 |
| 2,994,561 | 8/1961 | Kelley | 302/12 |
| 3,278,747 | 10/1966 | Ohmart | 209/111.5 X |
| 3,313,941 | 4/1967 | Marks | 209/111.5 X |
| 3,316,392 | 4/1967 | Bailey et al. | 250/271 X |
| 3,373,869 | 3/1968 | Burson | 209/111.5 |
| 3,506,829 | 4/1970 | Hannan | 250/271 |
| 3,753,484 | 8/1973 | Aiuola et al. | 302/11 X |

Primary Examiner—Joseph J. Rolla
Attorney, Agent, or Firm—Cushman, Darby & Cushman

[57] ABSTRACT

A method, system, and attachment for sorting articles, such as laundry or the like whereby each article includes as a part thereof a quantity of each of a number of different materials of the type which each produce secondary radiation at a characteristic energy level when x-ray, gamma or other radiation impinges thereon, the combination of materials forming a code uniquely identifing the article. Each article is passed through a pneumatic tube or on a conveyor line substantially one at a time past a source of radiation and a multi-channel energy level detector which produces an electrical output signal indicating the article, and also indicating when two or more combination codes are being simultaneously passed. The articles are then diverted in accordance with the electrical signal.

39 Claims, 5 Drawing Figures

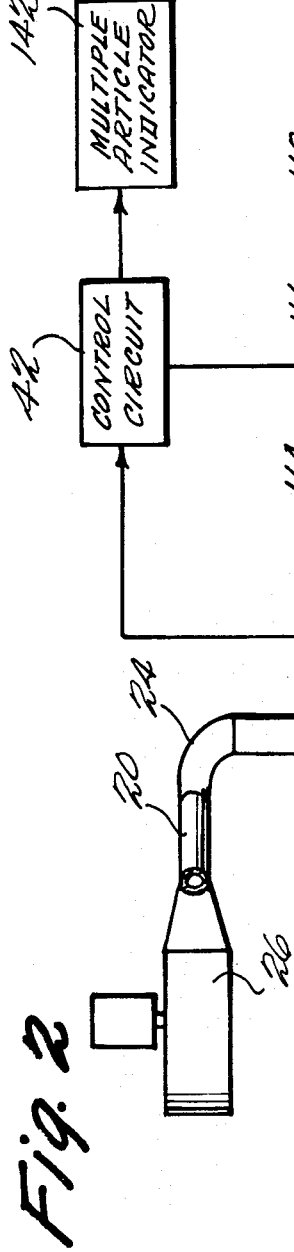
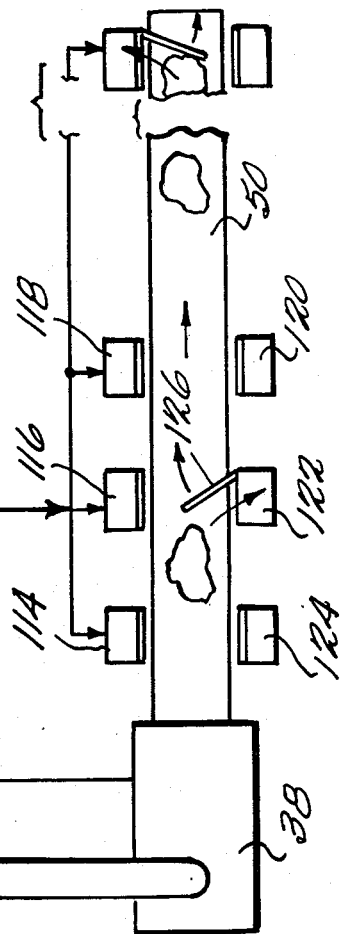
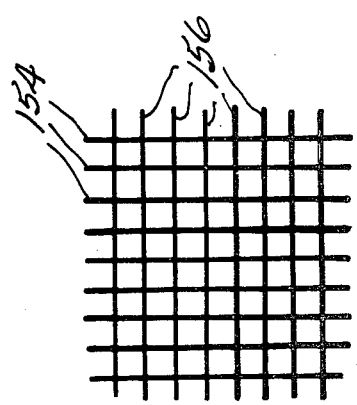
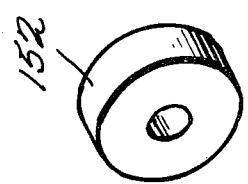
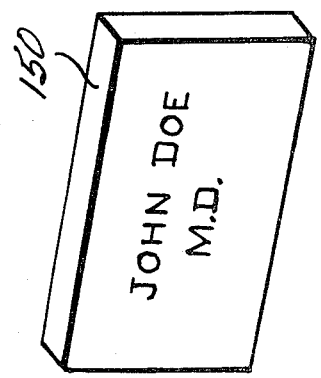

LINEN SORTER

This is a continuation, of application Ser. No. 604,081 filed Aug. 12, 1975, now abandoned which is a Continuation-in-Part of Ser. No. 565,133, filed Apr. 4, 1975 and now abandoned.

BRIEF DESCRIPTION OF THE PRIOR ART AND SUMMARY OF THE INVENTION

The invention relates to a system, apparatus, method and tag for use in sorting articles such as laundry or the like.

Many industrial and process situations occur in which it is necessary to sort different types of articles which are presented to a given location. One way to accomplish this function is to station one or more workers who visually differentiate articles as they are presented and either manually or with the aid of machinery place the articles in different locations or en route to different locations according to a desired sorting program. However, manual sorting has a number of obvious drawbacks.

First, the job is a tedious and often difficult one in which the pay is usually low and the working conditions undesirable. Accordingly, it is often difficult to attract and hold workers who can satisfactorily perform the sorting operation. Further, the speed at which human workers can recognize an article and cause its proper routing is limited.

The handling of large numbers of individual pieces of used, dirty laundry returned to a central plant for cleaning is a particularly difficult problem. Laundry is usually received in large sacks or other containers from customers. It is desirable to separate the laundry into groups of like pieces since the cleaning treatment for the various pieces may vary considerably. Further, it is desirable to have an accurate count of the various pieces which are returned by each customer to make sure that all of the laundry which has been furnished to the customer is in fact returned. However, accurate manual counting of the laundry pieces is difficult at best and the counting is complicated by the rank odor often associated with used laundry.

Many techniques have been developed in the past for identifying articles which are presented to a detecting station and for routing the articles or taking other appropriate action automatically in view of the identity of the article. Many existing systems sense the identity of an article passing a sensing station with optical techniques, for example sensing the light reflected from a coded member attached to the articles comprising a plurality of variable width bars or the like. All optical techniques, however, require a predetermined orientation of the code member with regard to the sensor. Such an orientation is difficult, if not impossible, to obtain with regard to articles of laundry and the like in which any coded member or tag attached thereto is necessarily presented in a random orientation and may be covered by portions of the article.

Other techniques used in the past include electrical or mechanical techniques which cause perturbations of a uniform field, for example with metal particles or tags. Passive and active circuits can also be incorporated into the tag and detected. These techniques are not likely to be successful for sorting laundry in part because of at least occasional other metal particles moving past the field of view. Further, the tags are in general too expensive to be practical in a system where a large number of articles must be sorted. Resonant tags require either orientation or a complicated sensor to eliminate the need therefore. Including enough radio-active material to detect its presence in the pieces of laundry is not only expensive, but might present a health hazard as well. Other detecting techniques have similar drawbacks.

Another technique which has been used in the past for identifying articles utilizes the well-known phenomena that certain materials respond to impingement of x-ray, gamma ray or similar radiation by producing secondary radiation, often termed fluorescence, having a characteristic energy level and a characteristic wave length which can be determined to identify the material. For example, the patent to Edholm U.S. Pat. No. 2,957,079, describes a technique and device for detecting coded labels in which x-ray, gamma or other radiation is impinged upon labels on articles moving past the source and the secondary radiation directed to a crystal which produces diffraction which can be analyzed to determine the specific material. Various combinations of materials can be employed in the label to provide a code uniquely identifying the passing article.

One of the difficulties of the system described in Edholm is that it is not fully satisfactory for a system such as required for laundry coding and sorting thereby the labels will be randomly oriented with respect to the detector and source and will often be covered by portions of the article. Further, either multiple crystals or rotation of a single crystal during passage of each tag are required to sweep the frequency band of the materials coding the tag. The difficulties of rotation and using multiple crystals increase with speed and are very difficult at high speeds such as required for laundry sorting.

The present invention relates to a system, apparatus, method and attachment for sorting articles, and particularly for sorting laundry articles, whereby a part of the article includes a quantity of at least one material, and preferably a plurality of different materials, which each produce characteristic secondary radiation at predetermined energy levels in response to impinging x-ray radiation. The combination of present and absent materials forms a code uniquely identifying the article. Each different material in effect constitutes a binary digit with the presence indicating one value, for example one, and the absence indicating the other value, for example zero. The articles are conveyed in random orientation past the source of radiation so that a conventional detector receives the secondary radiation from the article and produces electrical output pulses having an amplitude proportional to the fluorescent energy received. A semiconductor, energy dispersive energy detector is preferred, but a gas tube detector may possibly be used alternatively. Such detector is connected to a conventional multi-channel analyzer of the type which produces a series of electrical outputs proportional to the number of pulses received at each of a plurality of energy levels. The number of pulses produced at each energy level determines whether a given material is present as a part of the article. The patent to Hendee et al, U.S. Pat. No. 3,102,952, describes a system of this type for analyzing multi-component materials by x-ray fluorscence. The output signal of the detector is then used to control movement of the article in accordance with its identity after it has passed the detector.

The fluorescent material or materials may be dispersed throughout the garment, for example by painting, spraying or producing a resin finish, if all, or a large portion of, the garment passes the detector in a sufficiently short time. Alternatively and preferably the material may be formed as part of a tag, button or the like which can be used also for purposes such as visually identifying a garment wearer or the article. The fluorescent material may be incorporated into thermoplastic threads which are then woven or otherwise formed into the tag or the article.

According to one embodiment of the invention described in detail below, the soiled linen or other articles are deposited in a hopper and conveyed past an energizing source and a detector which provides an output signal indicating the identity of the article. The articles are preferably moved by a pair of endless belt conveyors past the source and detector and thereafter deposit on a further conveyor for movement and subsequent sorting. The further conveyor includes a belt having a plurality of bins and deflectors disposed along its length. Deflectors are operated in accordance with a signal provided by the detectors to cause deposition of the articles in an appropriate bin.

The particular technique of this invention has a number of substantial advantages. The quantity of material can be incorporated into the articles in a variety of ways. If a tag is employed, the tag can assume any cross-sectional geometry and can be located at any point in the articles. When the article is a garment, the tag can be located, if desired, inside the garment or may be used as a name tag or the like. The material need not be incorporated in quantities which are hazardous on contact with or consumption by humans. The material further is not intrinsically hazardous. The articles can be conveyed past the detector substantially one at a time at a very high rate, for example 6,000 articles per hour. The materials which are incorporated can be used in very small quantities at reasonable cost, permitting the system to practically be employed even when millions of pieces of laundry must be each coded.

Many other objects and purposes of the invention will be clear from the following detailed description of the drawings.

BRIEF DESCRIPTION OF THE DRAWINGS

FIG. 2 shows a top view of the embodiment of FIG. 1.

FIG. 3 shows a perspective view of coding tag.

FIG. 4 shows a perspective view of another tag.

FIG. 5 shows a view of an attachment formed of thermoplastic threads with the fluorescent material included therein.

DETAILED DESCRIPTION OF THE DRAWINGS

Figure 1:
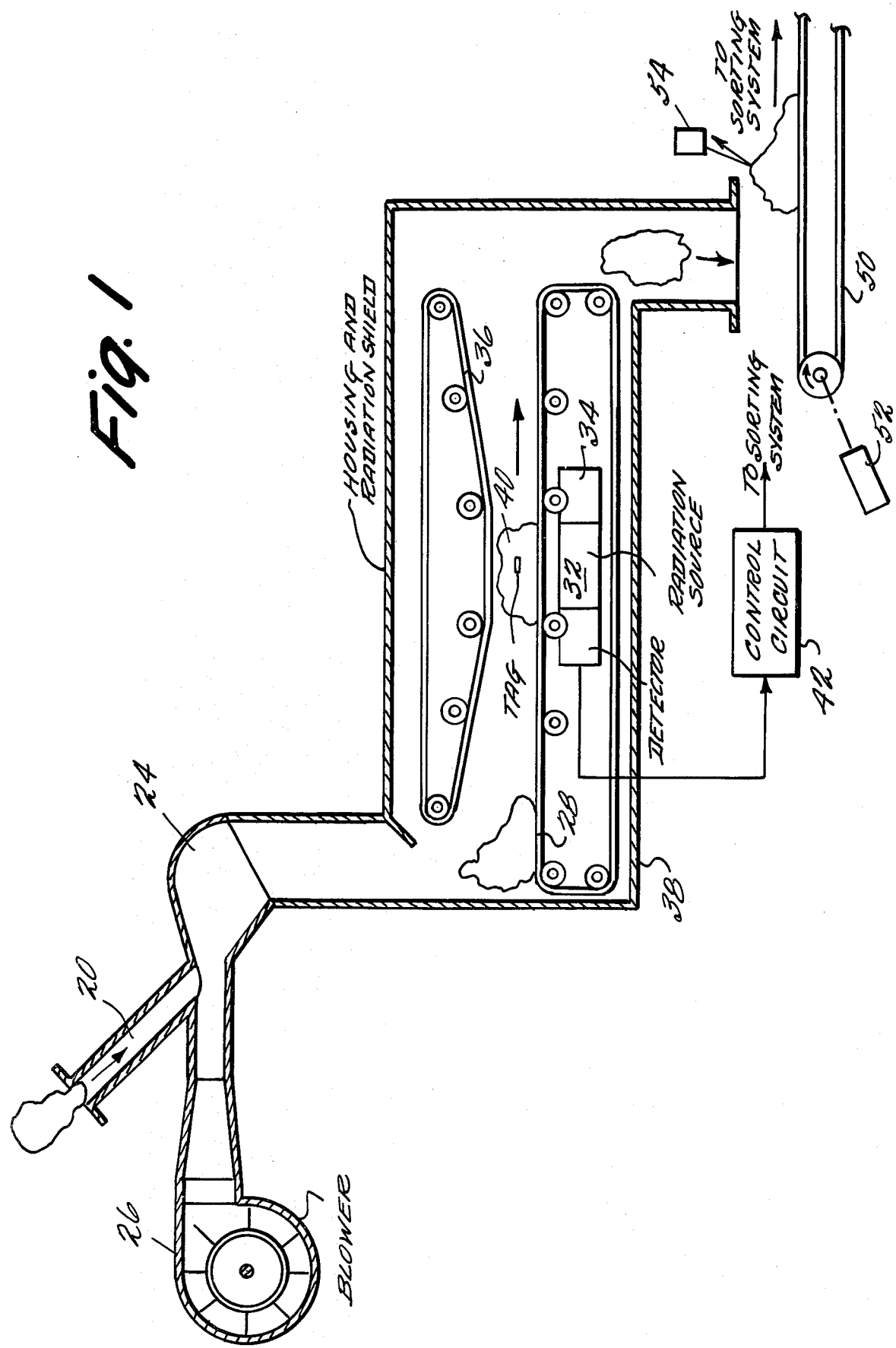
FIG. 1 shows a sectional, side schematic view of a first embodiment of this invention for sorting articles such as laundry.

Reference is now made to FIG. 1 which illustrates a first embodiment in which articles to be sorted, such as towels, sheets, robes and the like, are deposited, preferably one at a time, in a chute or hopper 20 and pneumatically conveyed down a tube 24 entrained in an air stream generated by a conventional blower 26. The articles of laundry fall by gravity onto an endless conveyor belt 28 driven by any conventional motor or the like (not shown) and are conveyed past a detector station comprising a radiation source 32 and a conventional solid state detector 34. Hopper 20 can be arranged so that the articles fall directly by gravity without an air stream onto conveyor 28. A second endless conveyor 36 moves above the articles to reduce the path length between source 32, detector 34 and the tag and to help ensure presentation of the articles one at a time to source 32 and detector 34. Belts 28 and 36 as well as detector 34 and source 32 are housed within a housing 38 which helps to shield the exterior thereof from stray radiation.

Radiation source 32 may, for example, be any conventional radiation source of the type which will produce suitable x-ray fluorescence; Americium 241 and Gadolinium 153 are believed to be suitable and are available at a reasonable cost. Also, conventional x-ray tubes may serve as a source. The source characteristic energy must be equal to or above the highest fluorescence energy characteristic of the tag elements employed. The x-ray radiation produced by source 32 passes through each article of laundry 40 which passes the source randomly oriented. Each such article has disposed therein as a part thereof a quantity of material which produces secondary radiation or fluorescence at a predetermined energy level in response to impinging x-ray radiation. As discussed in detail below, this material may be formed as a tag attached to the article 40 or may be dispersed throughout the entire article. Preferably at least two different types of materials are included in each article and the presence or absence of a given type of material in effect represents a binary digit of a code identifying the article.

The secondary radiation given off by the material incorporated within the article of laundry 40 is detected by conventional solid state detector 34 which preferably includes a multi-channel analyzer which produces a series of electrical signals proportional to the number of pulses at each channel. While the intensity of the received secondary radiation varies inversely with the separation between source and material, this is compensated at least in part by the fact that the material further from the source will remain longer in the radiation path which spreads out from the source. Such devices are conventional and are available commercially. Thus, detector 34 produces an electrical signal which identifies the article 40 passing thereby. This electrical signal is applied to a conventional control circuit 42, which may include a conventional mini-computer or the like and which ascertains the elements present by consideration of the outputs of the analyzer channels. The computer 42 also produces a suitable output control signal controlling subsequent movement of the article to route it as illustrated in FIG. 2 to a location whereby it can be subsequently processed and further provides a count of the number of articles of each type passing detector 34 and source 32.

It is possible that two or more tags may move past detector 34 at substantially the same time. However, if each of the articles includes roughly the same quantity of one particular material then the number of pulse counts produced by detector 34 with respect to that material indicates the number of articles which are simultaneously passing detector 34 since the number of counts will be doubled when the quantity of that material passing the detector 34 is doubled by simultaneous passage of two articles.

The articles after passing source 32 and detector 34 fall off endless conveyor belt 28 out of housing 38 and onto a subsequent conveyor belt 50 shown in FIG. 2 for conveyance to a sorting system which distributes articles in accordance with the signal produced by circuit 42. In order to distribute the articles their identity and position on belt 50 must be known. A shaft encoder 52 and photodetector 54 provide signals to circuit 42 from which the position of each article 40 on belt 50 at a given time can be determined.

Referring to FIG. 2 the articles after passage through housing 38 fall onto conveyor belt 50 which has disposed along its length a plurality of sorter bins, for example bins 114, 116, 118, 120, 122 and 124. Each such bin has associated therewith a deflector, for example deflector 126 associated with bin 122. These deflectors can be moved automatically into the path of a given article on belt 50 to deflect that passing article of laundry into the associated bin. The deflectors are operated by signals provided by the control circuit 42 with suitable delays built in according to the signals provided by photodetector 54 and shaft encoder 52 so that the deflector is operated at the appropriate time to cause deflection of the appropriate piece of linen or other article. An indication is also given by control circuit 42 when multiple articles are passing the source 32 and detector 34 and this indication is given by a conventional indicator 142 (see FIG. 4). Multiple articles passing simultaneously may be deflected to a suitable location for re-entry into hopper 20 or for manual handling.

Reference is now made to FIGS. 3-5 which illustrate schematically how the materials can be incorporated into the various articles. As illustrated in FIG. 3 a tag 150 may be attached to each of the articles and can be used as a name tag and formed in that fashion as shown in FIG. 3, as a button 152 as shown in FIG. 4, or in any other suitable configuration. The tag may be formed of a plurality of threads, for example threads 154 and 156 in FIG. 5 each including conventional thermoplastic material incorporating therein a suitable fluorescence material. Any of a number of fluorescence materials can be used in the system depending upon the amplitude of the signals they produce and their relative cost. Suitable tag elements include compounds such as:

barium oxide
ceric oxalate
lanthanum oxide
praseodymium oxide
neodymium nitrate
samanium oxide or compounds of other elements such as bismuth or lead.

Many changes and modifications in the above described embodiment of the invention can, of course, be carried out without departing from the scope thereof. Accordingly that scope is intended to be limited only by the scope of the appended claims.

What is claimed is:

1. A method of sorting articles or the like comprising the steps of:
    passing, substantially one at a time, randomly oriented articles past a source of impinging radiation, at least some of said articles having as a part thereof a quantity of at least two materials which produce x-ray secondary radiation in response to exciting radiation impinging thereon, and which form a code identifying the article,
    impinging said exciting radiation onto said articles from said source so that said secondary radiation is produced,
    detecting discretely each of the secondary radiations and producing a signal indicating the passing articles including the steps of applying said secondary radiation to an x-ray detector to produce a series of electrical output pulses at each of a plurality of energy levels, each associated with a quantity of a different material and the number of pulses in a given time indicating the amount of x-ray radiation detected at that energy level, applying said pulses to a multi-channel analyzer and counting the number of pulses produced at each of said energy levels in a given time to determine whether a given material is present as a part of said article, and
    controlling further movement of said article in accordance with said signal.

2. A system for sorting articles at least some having attached as a part thereof a quantity of at least two materials which produce x-ray secondary radiation at a predetermined energy level in response to exciting radiation impinging thereon and which form a code identifying the article comprising:
    a source of said exciting radiation,
    means for conveying said article randomly oriented past said source,
    a detector for receiving said secondary radiation and producing an electrical output signal indicating the material attached to said article and accordingly identifying the article, means for producing a series of electrical output pulses at each of a plurality of energy levels, the number of pulses in a given time indicating the amount of x-ray radiation detected at that energy level, said detector comprising an x-ray sensor for detecting the secondary radiation produced by said materials at each of said energy levels and means for counting the number of pulses produced at each of said energy levels to determine whether a given material is present as a part of said article and producing said output signal in accordance with said determination, and
    means for directing movement of said articles after movement past said source and detector in accordance with said output signal.

3. A system for sorting articles at least some having attached as a part thereof a quantity of at least two materials which produce secondary radiation at a predetermined energy level in response to impinging radiation and which form a code identifying the article comprising:
    a source of x-ray radiation,
    means for conveying said article randomly oriented past said source,
    a detector for receiving said secondary radiation and producing an electrical output signal indicating the material attached to said article and accordingly identifying the article, said detector comprising a solid state, energy dispersive semiconductor x-ray sensor, means for producing a series of electrical output pulses at each of a plurality of energy levels, each associated with a quantity of a different material, and means for counting the number of pulses produced at each of said energy levels to determine whether a given material is present as a part of said article, and
    means for directing movement of said articles after movement past said source and detector in accordance with said output signal.

4. A system as in claim 3 wherein said conveying means includes a pneumatic tube and further including a hopper connected to said tube for receiving said articles.

5. A system as in claim 3 wherein said directing means includes a conveyor belt, a plurality of deflectors each activated in accordance with said output signal to move into a deflecting position with respect to articles on said belt and a bin associated with each deflector for receiving an article deflected by an activated deflector.

6. A system as in claim 3 wherein said source is Americium 241.

7. A system as in claim 3 wherein said detector includes means for counting the number of articles passing said source.

8. A system as in claim 3 wherein said conveying means includes an endless conveyor belt and further including pneumatic means for depositing said articles onto said conveyor belt for movement past said source and detector.

9. A system as in claim 8 wherein said conveying means includes a second endless conveyor belt with the belts engaging and moving the articles between them.

10. A system as in claim 3 wherein said detector includes means for producing an output signal indicating, from the number of pulses counted at at least one energy level, the number of articles passing said source at that time.

11. A system as in claim 10 wherein said means for producing an output signal includes means for producing a first signal indicating a single article when the count in at least one energy level is less than a predetermined count and producing a second signal indicating multiple articles when the count in said one energy level is greater than said predetermined count.

12. A system as in claim 3 wherein said articles are pieces of laundry and including a plurality of said pieces.

13. A system as in claim 12 wherein said materials are dispersed through each said piece.

14. A system as in claim 12 further including a tag attached to each of said pieces of laundry incorporating at least quantities of first and second different materials.

15. A system as in claim 14 wherein each tag is formed of thermoplastic material.

16. A system as in claim 15 wherein said tag is formed of at least two different types of threads each containing one of said materials.

17. A method of sorting textile articles or the like comprising the steps of:
passing, substantially one at a time, randomly oriented articles past a source of impinging radiation, at least some of said articles having as a part thereof a quantity of at least two materials which produce secondary radiation in response to said impinging radiation, and which form a code identifying the article,
impinging x-ray radiation onto said articles from said source so that said secondary radiation is produced,
detecting discretely each of the secondary radiations and producing a signal indicating the passing articles including the steps of applying said secondary radiation to a semiconductor energy dispersive x-ray detector to produce a series of electrical output pulses at each of a plurality of energy levels, each associated with a quantity of a different material, applying said pulses to a multi-channel analyzer and counting the number of pulses produced at each of said energy levels to determine whether a given material is present as a part of said article, and
controlling further movement of said article in accordance with said signal.

18. A method as in claim 17 wherein said step of detecting includes the step of detecting energies of the secondary radiation emitted by said material.

19. A method as in claim 17 including the further step of loading articles of laundry each having a tag incorporating said quantity of material therein into a hopper pneumatically connected to a delivery tube.

20. A method as in claim 17 including the further step of counting the number of articles passing said source.

21. A method as in claim 17 wherein said step of passing includes the step of passing said articles on a conveyor belt past the source of said impinging radiation and the detector of said secondary radiation disposed adjacent thereof.

22. A method as in claim 21 wherein said step of controlling includes the steps of depositing said articles on said belt and moving one of a plurality of deflection means into said stream in accordance with said signal to deflect said article into a predetermined bin.

23. A method as in claim 17 wherein said step of detecting includes the further step of producing an output signal indicating, from the number of pulses counted at at least one energy level, the number of articles passing said source at that time.

24. A method as in claim 23 wherein said step of producing an output signal includes the step of producing a first signal indicating a single article when the count is at least one energy level is less than a predetermined count and producing a second signal indicating multiple articles when the count in said one energy level is greater than said predetermined count.

25. A method as in claim 17 wherein said step of passing includes the step of operating an endless conveyor belt which moves past said source and pneumatically depositing said articles on said belt.

26. A method as in claim 25 including the further step of operating a second endless conveyor belt with said article moving between said belts.

27. An apparatus for sorting textile articles or the like comprising:
a source of impinging radiation,
means for passing, substantially one at a time, randomly oriented articles past said source of impinging radiation, at least some of said articles having as a part thereof a quantity of at least two materials which produce secondary radiation in response to said impinging radiation, and which form a code identifying the article,
means for detecting discretely each of the secondary radiations and producing a signal indicating the passing articles including means for applying said secondary radiation to a multi-channel recorder producing a series of electrical output pulses at each of a plurality of energy levels, each associated with a quantity of a different material, and means for counting the number of pulses produced at each of said energy levels to determine whether a given material is present as a part of said article, and
means for controlling further movement of said article in accordance with said signal.

28. An apparatus as in claim 27 wherein said detecting means includes means for detecting the energy levels.

29. An apparatus as in claim 27 including means for loading articles of laundry each having a tag incorporating said quantity of material therein into a hopper pneumatically connected to a delivery tube.

30. An apparatus as in claim 27, said parts including a coded tag for identifying an article formed of thermoplastic material and including first and second types of threads each formed of a different material of the type which produces secondary radiation at a predetermined energy level in response to radiation impinging thereon and which forms said code identifying the article.

31. An apparatus as in claim 27 including means for counting the number of articles passing said source.

32. An apparatus as in claim 27 further including means for impinging said radiation onto said articles.

33. An apparatus as in claim 32 wherein said impinging means includes means for impinging x-rays.

34. An apparatus as in claim 27 wherein said passing means includes a conveyor belt for moving said articles past a source of said impinging radiation and a detector of said secondary radiation disposed adjacent thereof.

35. An apparatus as in claim 34 wherein said controlling means includes means for depositing said articles on a conveyor and means for moving one of a plurality of deflection means into the path of said article in accordance with said signal to deflect said article into a predetermined bin.

36. An apparatus as in claim 27 wherein said passing means includes an endless conveyor belt which moves past said source and means for pneumatically depositing said articles on said belt.

37. An apparatus as in claim 36 wherein said passing means further includes a second endless conveyor belt with said article moving between said belts.

38. An apparatus as in claim 27 wherein said detecting means includes means for producing an output signal indicating, from the number of pulses counted at at least one energy level, the number of articles passing said source at that time.

39. An apparatus as in claim 38 wherein means for producing an output signal includes means for producing a first signal indicating a single article when the count in at least one energy level is less than a predetermined count and producing a second signal indicating multiple articles when the count is said one energy level is greater than said predetermined count.

* * * * *